US012640019B2

(12) United States Patent
Michalowicz

(10) Patent No.: US 12,640,019 B2
(45) Date of Patent: May 26, 2026

(54) SECURITY SYSTEM FOR AN ENVIRONMENT

(71) Applicant: Kidde Fire Protection, LLC, Bradenton, FL (US)

(72) Inventor: Adam Michalowicz, Pomeranian (PL)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 0 days.

(21) Appl. No.: 18/746,231

(22) Filed: Jun. 18, 2024

(65) Prior Publication Data

US 2025/0006021 A1 Jan. 2, 2025

Related U.S. Application Data

(60) Provisional application No. 63/511,602, filed on Jun. 30, 2023.

(51) Int. Cl.

| | |
|---|---|
| ***G08B 13/08*** | (2006.01) |
| ***G08B 25/00*** | (2006.01) |
| ***G08B 29/18*** | (2006.01) |

(52) U.S. Cl.

CPC ........... *G08B 13/08* (2013.01); *G08B 25/008* (2013.01); *G08B 29/18* (2013.01)

(58) Field of Classification Search

CPC ....... G08B 13/08; G08B 29/18; G08B 25/008

See application file for complete search history.

(56) References Cited

U.S. PATENT DOCUMENTS

| | | | |
|---|---|---|---|
| 5,793,286 | A | 8/1998 | Greene |
| 7,080,061 | B2 | 7/2006 | Kabala |

(Continued)

FOREIGN PATENT DOCUMENTS

| | | | |
|---|---|---|---|
| KR | 101512295 | B1 | 4/2015 |
| WO | 02075685 | A3 | 3/2003 |

(Continued)

OTHER PUBLICATIONS

European Search Report for Application No. 24184792.0; Issued Nov. 25, 2024, 9 Pages.

*Primary Examiner* — John A Tweel, Jr.

(74) *Attorney, Agent, or Firm* — CANTOR COLBURN LLP

(57) ABSTRACT

Described herein is a security system for an area of interest (AOI). The system comprises motion detectors and receiver modules positioned in zones of the AOI, and transmitter modules installed on movable devices associated with the AOI. The transmitter modules communicate with the receiver modules present in a predefined area around the respective transmitter module and correspondingly transmit a set of signals comprising details of the movable devices having the respective transmitter module installed thereon. The system further comprises a control unit in communication with the motion detectors and the receiver modules. When the motion detectors associated with any of the zones detect a movement therein and the receiver modules associated with the respective zone further receive the signals transmitted by the transmitter module associated with the registered movable devices, the control unit is configured to deactivate the detectors present in the predefined area around the respective transmitter module.

20 Claims, 4 Drawing Sheets

(56) References Cited

U.S. PATENT DOCUMENTS

| | | | | |
|---|---|---|---|---|
| 9,508,247 | B2 | 11/2016 | Lee et al. | |
| 9,804,576 | B2 | 10/2017 | Scott et al. | |
| 10,062,533 | B2 * | 8/2018 | Qureshi | H01H 49/00 |
| 10,186,130 | B2 | 1/2019 | Whelan et al. | |
| 10,452,939 | B2 | 10/2019 | Tani et al. | |
| 2003/0080867 | A1 | 5/2003 | Rusinol Simon | |
| 2018/0005125 | A1 | 1/2018 | Fadell et al. | |

FOREIGN PATENT DOCUMENTS

| | | | |
|---|---|---|---|
| WO | 2004068544 | A3 | 3/2005 |
| WO | 2008131704 | A1 | 11/2008 |
| WO | 2010063319 | A1 | 6/2010 |
| WO | 2014036549 | A3 | 7/2014 |
| WO | 2016033233 | A1 | 3/2016 |
| WO | 2019025255 | A1 | 2/2019 |
| WO | 2022093650 | A1 | 5/2022 |

* cited by examiner

SECURITY SYSTEM FOR AN ENVIRONMENT

CROSS-REFERENCE TO RELATED APPLICATION

This patent application claims the benefit of U.S. Provisional Patent Application No. 63/511,602, filed on Jun. 30, 2023, which is incorporated by reference herein in its entirety.

BACKGROUND

This invention relates to the field of security systems, and more particularly, a security system for an area of interest (AOI) or environment.

In an environment such as a building, warehouse, and the like, a security system may be employed to detect an intrusion or unauthorized movement of people within the environment. The existing security system may include motion sensors that may be activated/armed when the environment is to be protected from intrusion or unauthorized movement. The system may correspondingly trigger an alarm upon detection of any movement within the environment. However, with the involvement or implementation of automated movable devices such as robots or machines in various commercial buildings, the existing security system may detect the movement of these movable devices or any authorized users as an intrusion or unauthorized movement and may further trigger a false alarm.

SUMMARY

Described herein is a security system for an area of interest (AOI). The security system comprises one or more motion detectors positioned in one or more zones associated with the AOI such that at least one motion detector is positioned in each of the zones, one or more receiver modules positioned in the one or more zones such that at least one receiver module is positioned in each of the zones, one or more transmitter modules installed on one or more registered movable devices associated with the AOI. Each of the one or more transmitter modules is configured to communicate with the one or more receiver modules present in a predefined area around the respective transmitter module and transmit, to the one or more receiver modules that is in communication with the respective transmitter module, a set of signals comprising details of the movable devices having the respective transmitter module installed thereon. The system further comprises a control unit in communication with the one or more motion detectors and the one or more receiver modules, wherein when the one or more motion detectors associated with any of the one or more zones detect a movement therein and the one or more receiver modules associated with the respective zone further receive the set of signals transmitted by the transmitter module associated with the one or more registered movable devices, the control unit is configured to deactivate the one or more motion detectors present in the predefined area around the respective transmitter module.

In one or more embodiments, when the one or more motion detectors associated with any of the one or more zones detect the movement therein and the one or more receiver modules associated with the respective zone fail to receive the set of signals transmitted by the transmitter module associated with the one or more registered movable devices, the control unit is configured to keep the one or more motion detectors activated and further generate an alarm signal indicative of detection of intrusion or unauthorized movement within the one or more zones.

In one or more embodiments, when the one or more motion detectors associated with any of the one or more zones detect the movement therein and the one or more receiver modules associated with the respective zone further receive the set of signals transmitted by the transmitter module associated with the one or more registered movable devices, the control unit is configured to restrict the generation of the alarm signal.

In one or more embodiments, when the one or more motion detectors associated with any of the one or more zones fail to detect the movement therein and the one or more receiver modules associated with the respective zone receive the set of signals transmitted by the transmitter module associated with the one or more registered movable devices, the control unit is configured to keep the one or more motion detectors activated and further restrict the generation of the alarm signal.

In one or more embodiments, the one or more receiver modules are radio frequency (RF) receivers, wherein the one or more transmitter modules are radio frequency (RF) transmitters.

In one or more embodiments, the control unit is in communication with an alarm system associated with the AOI, wherein the control unit is configured to transmit the generated alarm signal to the alarm system to actuate the alarm system.

In one or more embodiments, the control unit is in communication with one or more mobile devices associated with one or more registered security personnel of the AOI, wherein the control unit is configured to transmit the generated alarm signal to the one or more mobile devices.

In one or more embodiments, the control unit is in communication with a database, wherein the control unit is configured to authenticate and allow registration of the one or more movable devices, allow the one or more registered security personnel to assign the one or more transmitter modules to the one or more registered movable devices, and store, in the database, the details of the one or more registered movable devices and the respective assigned transmitter module being installed thereon.

In one or more embodiments, the control unit is configured to extract the details of the one or more registered movable devices from the set of signals received by the one or more receiver modules, track the movement of the one or more registered movable devices in the one or more zones based on the extracted details and the communication between the one or more receiver modules and the one or more transmitter modules, and store the tracked movement in the database.

In one or more embodiments, the system comprises one or more door and window sensors installed on doors and windows of the AOI, wherein the control unit is configured to generate the alarm signal upon detection of movement of the doors and/or windows by the one or more door and window sensors.

Also described herein is a security system for an area of interest (AOI). The security system comprises one or more motion detectors positioned in one or more zones associated with the AOI such that at least one motion detector is positioned in each of the zones, one or more receiver modules positioned in the one or more zones such that at least one receiver module is positioned in each of the zones, one or more transmitter modules assigned and provided to one or more registered users associated with the AOI. Each of the one or more transmitter modules is configured to communicate with the one or more receiver modules present in a predefined area around the respective transmitter module while the one or more registered users are moving in the one or more zones, and transmit, to the one or more receiver modules that is in communication with the respective transmitter module, a set of signals comprising details of the users having the respective transmitter module installed. The system further comprises a control unit in communication with the one or more motion detectors and the one or more receiver modules, wherein when the one or more motion detectors associated with any of the one or more zones detect a movement therein and the one or more receiver modules associated with the respective zone further receives the set of signals transmitted by the transmitter module associated with the one or more registered users, the control unit is configured to deactivate the one or more motion detectors present in the predefined area around the respective transmitter module.

In one or more embodiments, when the one or more motion detectors associated with any of the one or more zones detect the movement therein and the one or more receiver modules associated with the respective zone fail to receive the set of signals transmitted by the transmitter module associated with the one or more registered users, the control unit is configured to keep the one or more motion detectors activated and further generate an alarm signal indicative of detection of intrusion or unauthorized movement within the one or more zones.

In one or more embodiments, when the one or more motion detectors associated with any of the one or more zones detect the movement therein and the one or more receiver modules associated with the respective zone further detect the set of signals transmitted by the transmitter module associated with the one or more registered users, the control unit is configured to restrict the generation of the alarm signal.

In one or more embodiments, when the one or more motion detectors associated with any of the one or more zones fail to detect the movement therein and the one or more receiver modules associated with the respective zone receive the set of signals transmitted by the transmitter module associated with the one or more registered users, the control unit is configured to keep the one or more motion detectors activated and further restrict the generation of the alarm signal.

In one or more embodiments, the control unit is in communication with one or more mobile devices associated with one or more registered security personnel and the one or more registered users of the AOI, wherein the control unit is configured to transmit the generated alarm signal to the one or more mobile devices.

In one or more embodiments, the control unit is in communication with a database, wherein the control unit is configured to authenticate and allow registration of the one or more users, allow the one or more registered security personnel to assign the one or more transmitter modules to the one or more registered users, and store, in the database, the details of the one or more registered users and the respective assigned transmitter module.

In one or more embodiments, the control unit is configured to extract the details of the one or more registered users from the set of signals received by the one or more receiver modules, and track the movement of the one or more registered users in the one or more zones based on the extracted details and the communication between the one or more receiver modules and the one or more transmitter modules, and store the tracked movement in the database.

The foregoing summary is illustrative only and is not intended to be in any way limiting. In addition to the illustrative aspects, embodiments, and features described above, further aspects, embodiments, features, and techniques of the subject disclosure will become more apparent from the following description taken in conjunction with the drawings.

BRIEF DESCRIPTION OF THE DRAWINGS

The accompanying drawings are included to provide a further understanding of the subject disclosure and are incorporated in and constitute a part of this specification. The drawings illustrate exemplary embodiments of the subject disclosure and, together with the description, serve to explain the principles of the subject disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
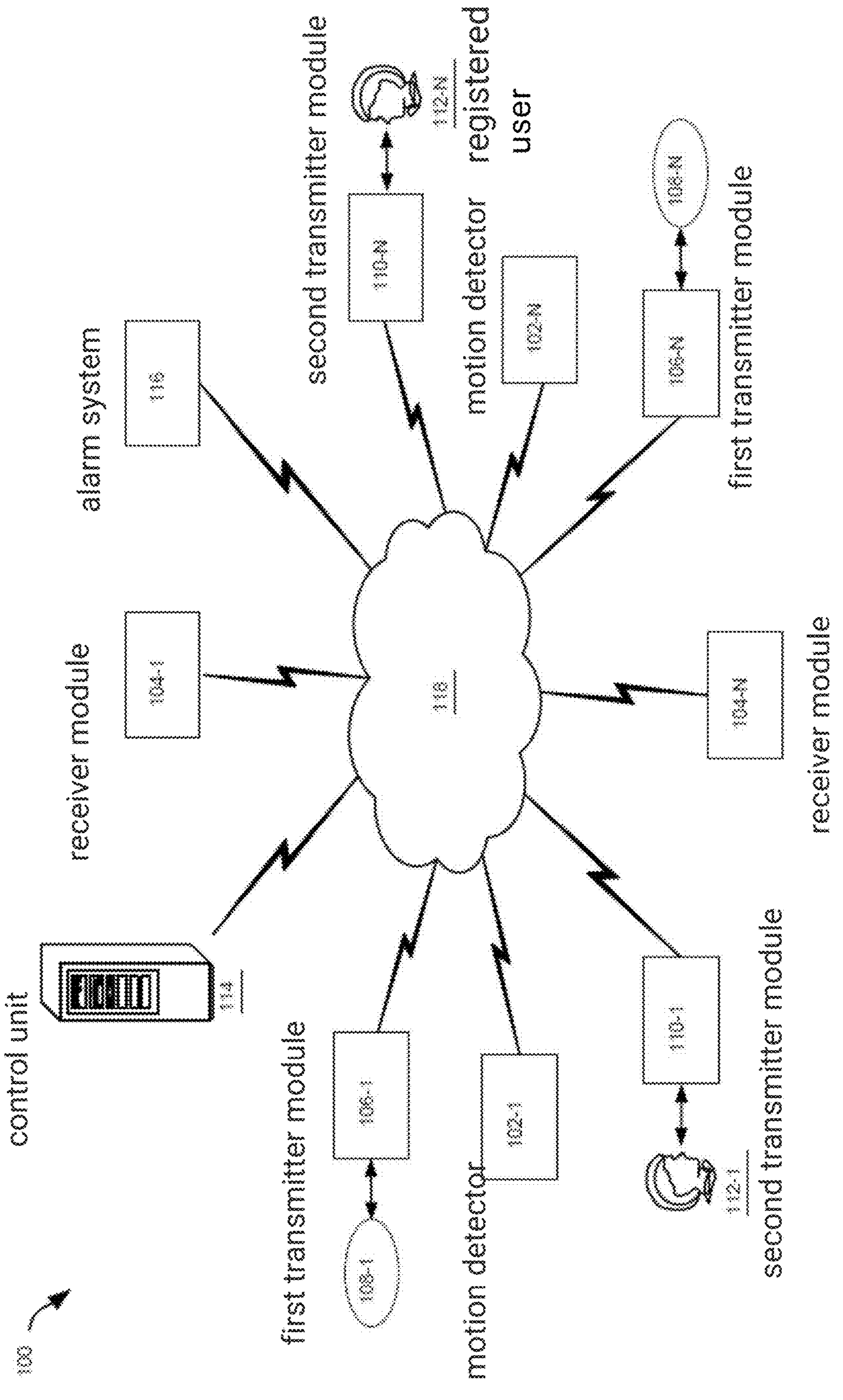
FIG. 1 illustrates an exemplary network architecture of a security system implemented in an area of interest (AOI) or multi-zone environment, which may restrict the false triggering of alarms when authorized movable devices or authorized users are operating within the AOI while keeping the overall security system fully functional, in accordance with one or more embodiments of the subject disclosure.

The following is a detailed description of embodiments of the subject disclosure depicted in the accompanying drawings. The embodiments are in such detail as to clearly communicate the subject disclosure. However, the amount of detail offered is not intended to limit the anticipated variations of embodiments; on the contrary, the intention is to cover all modifications, equivalents, and alternatives falling within the spirit and scope of the subject disclosure as defined by the appended claims.

Various terms are used herein. To the extent a term used in a claim is not defined below, it should be given the broadest definition persons in the pertinent art have given that term as reflected in printed publications and issued patents at the time of filing.

In the specification, reference may be made to the spatial relationships between various components and to the spatial orientation of various aspects of components as the devices are depicted in the attached drawings. However, as will be recognized by those skilled in the art after a complete reading of the subject disclosure, the components of this invention. described herein may be positioned in any desired orientation. Thus, the use of terms such as “above,” “below,” “upper,” “lower,” “first”, “second” or other like terms to describe a spatial relationship between various components or to describe the spatial orientation of aspects of such components should be understood to describe a relative relationship between the components or a spatial orientation of aspects of such components, respectively, described herein may be oriented in any desired direction.

In an environment such as a building, warehouse, field, and the like, a security system may be employed to detect an intrusion or unauthorized movement of people within the environment. The security system may include motion sensors installed at different zones of the environment to detect movement within the zones. The security system may further include door and window sensors (DWS) to detect the unauthorized opening of the doors or windows of the environment. The security system may be activated/armed when the environment is to be protected from intrusion or unauthorized movement. The security system may accordingly trigger an alarm upon detection of intrusion or any movement within the environment, in order to alert the security personnel associated with the environment. However, with recent developments in automation, the involvement or implementation of automated movable devices such as robots or machines in various commercial buildings has increased. The robots or machines may be employed and activated, especially during night or off-days, to transport goods within the environment, check the inventory of goods, clean the environment, and perform various other activities. However, the security system may fail to differentiate between movable devices and humans. As a result, the security system may falsely detect the movement of these authorized movable devices or any authorized users as intrusion or unauthorized movement and accordingly trigger a false alarm. There is therefore a need to enable the security system to differentiate between authorized movable devices (or authorized users) and unauthorized humans.

Generally, to avoid false alarm triggering during the operating time of the authorized movable devices or authorized users, the existing security system may generally be partially disarmed (motion detectors switched OFF, and the DWS sensors may be switched ON), however, this may compromise on the security of the environment. There is, therefore, a need to restrict the false triggering of alarms when the authorized movable devices or authorized users are operating within the environment while keeping the overall security system fully functional.

This invention provides a simple, improved, efficient, and cost-effective security system for a multi-zone environment or an area of interest, which may differ between the authorized movable devices (or authorized users) and unauthorized humans, and further restrict false triggering of the alarm when the authorized movable devices or authorized users are operating within the environment while keeping the overall security system fully functional.

Figure 2:
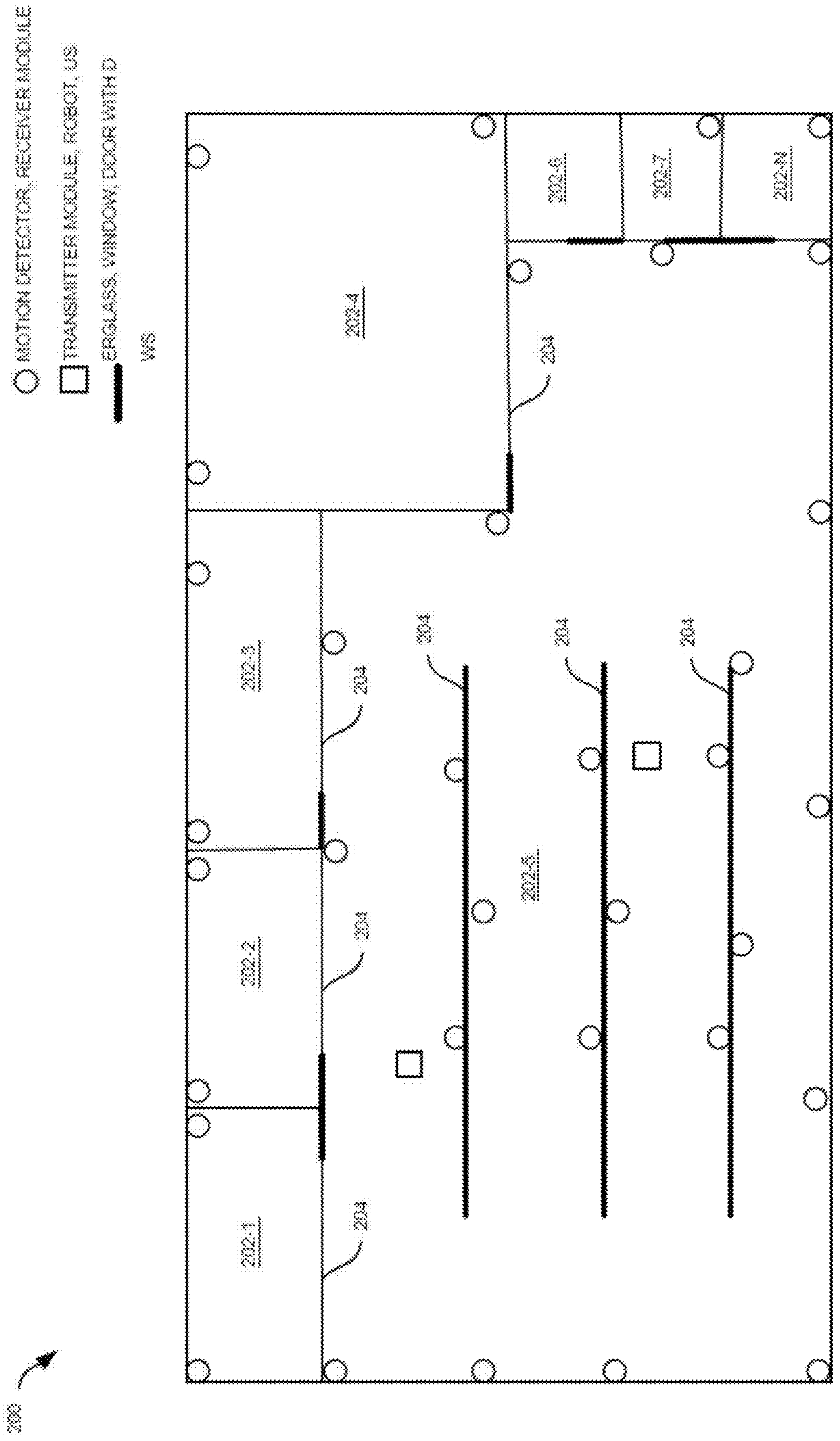
FIG. 2 illustrates an exemplary representation of the AOI where the security system of FIG. 1 is implemented, in accordance with one or more embodiments of the subject disclosure.

Referring to FIGS. 1 and 2, a security system 100 for an area of interest (AOI) or environment 200 is disclosed. The AOI or environment 200 may be a building, a multi-zone building, an open field, a ship, a train, but is not limited to the like. The AOI 200 may include one or more zones 202-1 to 202-N (collectively referred to as zones 202, herein) formed by multiple separation walls 204 and doors as shown in FIG. 2. The system 100 may include one or more motion detectors 102-1 to 102-N (collectively referred to as motion detectors or motion sensors 102, herein) positioned in the zones 202 associated with the AOI 200 such that at least one motion detector is positioned in each of the zones. The system 100 may further include one or more receiver modules 104-1 to 104-N positioned in the zones 202 such that at least one receiver module is positioned in each of the zones. In one or more embodiments, the motion detectors 102 and receiver modules 104 may be positioned or installed on the walls, roof, and/or thermostats of the zones 202 and facing in a predetermined direction such that the motion detectors 102 and receiver modules 104 may efficiently cover the entire zones 202 of the AOI 200 without any dead space or shadow area between the coverage area of the motion detectors 102 and receiver modules 104. In one or more embodiments, the receiver modules 104 may be installed inside or attached to the motion detectors 102, however, in other embodiments, the receiver modules 104 and the motion detectors 102 may also be separate standalone devices.

The system 100 may further include one or more first transmitter modules 106-1 to 106-N (collectively referred to as first transmitter modules 106, herein) installed on one or more registered movable devices 108-1 to 108-N (collectively referred to as movable devices 108, herein) associated with the AOI 200 such that at least one of the first transmitter module is installed on each of the movable devices. In one or more embodiments, the movable devices may include but are not limited to automated robots or machines used to transport goods within the AOI 200, check the inventory of goods, clean the zones 202, and perform various other activities. The details of the registered movable devices 108 and the respective assigned first transmitter module 106 may be stored in a database associated with the system 100

Further, the system 100 may include one or more second transmitter modules 110-1 to 110-N (also referred to as second transmitter modules 110, herein) assigned and provided to one or more registered users 112-1 to 112-N (collectively referred to as registered users or users 112, herein) associated with the AOI 200 such that at least one of the second transmitter module is provided to each of the registered users. The registered users 112 may include but are not limited to authorized security persons, maintenance persons, authorized visitors, and admin. The users 112 may be authenticated by the admin and accordingly provided with the second transmitter modules 110. The details of the registered users 112 and the respective assigned second transmitter module 110 may be stored in the database associated with the system 100.

In one or more embodiments, the receiver modules 104 may be radio frequency (RF) receivers but are not limited to the like. Further, the first and second transmitter modules 106, 110 may be radio frequency (RF) transmitters but are not limited to the like. Each of the receiver modules 104 may be operable to communicate with transmitter modules 106, 110 that are present in a predefined area or coverage area around the respective receiver module 104. Further, the transmitter modules 106, 110 may be operable to transmit, to one or more receiver modules 104 that are in communication with the respective transmitter modules 106, 110, a set of encrypted signals comprising the details of the movable devices 108 or users 112 having the respective transmitter module. Accordingly, the receiver modules 104 may detect the presence of the transmitter modules 106, 110 and the corresponding registered movable devices 108 or registered users 112 when they come into the predefined area or coverage area of the receiver modules 104 while moving in the one or more zones 202. This may further facilitate the system 100 in the detection and identification of the registered users 112 and/or movable devices 108 in the AOI 200 and avoid a false alarm triggering of the system 100 upon detection of the registered users 112 and/or movable devices 108, however, keeping the system 100 active for detecting any intrusion and generating an alarm in an event of the intrusion.

In one or more embodiments, the system 100 may further include one or more door and window sensors (DWS) installed on the doors and windows of the AOI 200 to detect movement of the doors and/or windows of the AOI 200.

The system 100 may include a control unit 114 in communication with the motion detectors 102, the receiver modules 104, and the DWS. The control unit 114 may be in further communication with an alarm system 116 of the AOI 200. In one or more embodiments, the control unit 114 may be a central server associated with the system 100 or the alarm system 116 of the AOI 200. Further, in other embodiments, the control unit 114 may be in communication with the central server associated with the AOI 200. Furthermore, in some embodiments, the control unit 114 may be in communication with a central server or controller associated with the alarm system 116.

Figure 3:
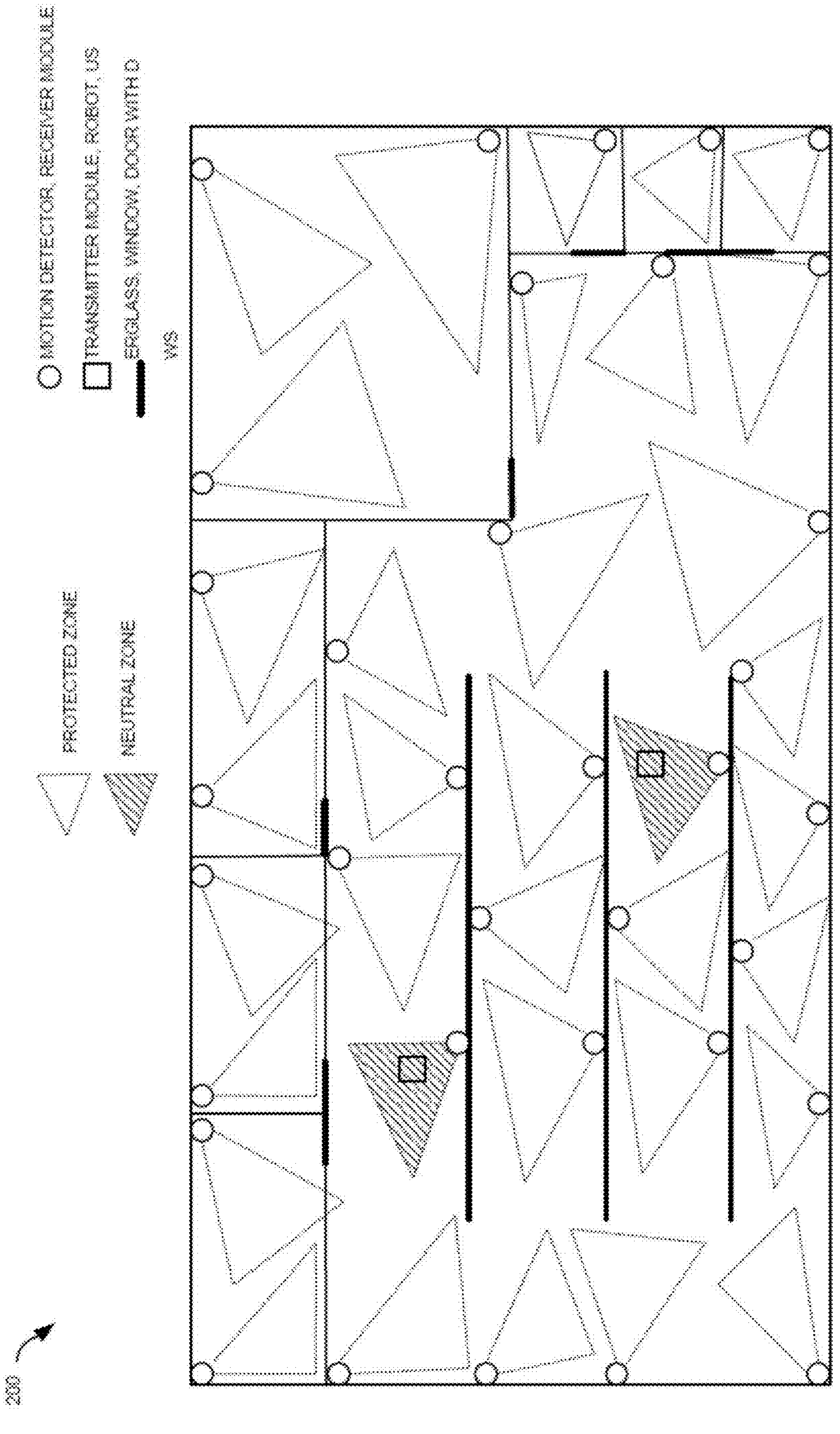
FIG. 3 illustrates an exemplary representation depicting the operation of the security system at the AOI of FIG. 1 to elaborate upon the working of the security system, in accordance with one or more embodiments of the subject disclosure.

Referring to FIG. 3, in one or more embodiments, when the motion detectors 102 associated with any of the zones 202 detect a movement therein and the receiver modules 104 associated with the respective zone further receive the set of encrypted signals transmitted by the first transmitter module 106 associated with the registered movable devices 108 and/or the second transmitter module 110 associated with the registered users 112, the control unit 114 may be configured to deactivate the motion detectors 102 present in the predefined area around the respective first and/or transmitter modules 106, 110, however, keep the rest of the motion detectors 102 activated. The coverage area of the deactivated motion detectors 102 may be a neutral zone and the coverage area of the active motion detectors 102 may be the protected zone. Accordingly, the movable devices 108 may move in the neutral zone without any false triggering of the alarm system 116.

In one or more embodiments, when the motion detectors 102 associated with any of the zones 202 detect the movement therein, however, the receiver modules 104 associated with the respective zone fail to receive the set of encrypted signals transmitted by any of the first and/or second transmitter module 106, 110, the control unit 114 may identify this event as intrusion or unauthorized movement within the zones 202 and correspondingly keep the motion detectors 102 activated and further generate an alarm signal to trigger the alarm system 116 of the building and alert the security personnel.

In one or more embodiments, when the motion detectors 102 associated with any of the zones 202 fail to detect the movement therein while the receiver modules 104 associated with the respective zone receive the set of encrypted signals transmitted by the first transmitter module 106 associated with the registered movable devices 108 and/or the second transmitter module 110 associated with the registered users 112, the control unit 114 may be configured to keep the motion detectors 102 activated and restrict the generation of the alarm signal. This event may occur when the zones 202 are separated by the partition wall 204, where the motion detectors 102 on one side of the wall 204 may fail to detect movement on the other side of the wall 204, but the set of encrypted signals may be transmitted by the transmitter modules 106, 110 on the other side of the wall 204 may pass through the wall 204 and received by the receiver modules 104 on the opposite side.

In one or more embodiments, the control unit 114 may be in communication with one or more mobile devices associated with registered security personnel of the AOI 200. The control unit 114 may be configured to transmit the generated alarm signal to the mobile devices to alert the registered security personnel in the event of detection of intrusion or unauthorized movement in the zones 202. Further, the control unit 114 may be configured to transmit the details of the registered movable devices 108 and/or registered users 112 moving in the zones 202 to the database and on the mobile devices of the security personnel. This may allow the system 100 to track and store the movement of the registered movable devices 108 and/or registered users 112 within the AOI 200.

In one or more embodiments, the control unit 114 may be configured to authenticate and allow registration of the one or more movable devices 108 and the one or more users 112 in the system 100. Further, the system 100 may allow the registered security personnel to assign the first transmitter modules 106 to the registered movable devices 108 and further assign the second transmitter modules 110 to the registered users 112. Furthermore, the details of the registered movable devices 108, the registered users 112, and the respective assigned transmitter modules 106, 110 may be stored in the database of the system 100.

In one or more embodiments, the motion detectors 102, the receiver modules 104, the first and second transmitter modules 106, 110, and the DWS may be wired or wireless modules. Further, the motion detectors 102, the receiver modules 104, the first and second transmitter modules 106, 110, and the DWS may include an in-built, compact, low-power-consuming, rechargeable battery. However, the motion detectors 102, the receiver modules 104, and the DWS may also be electrically connected to an external power source provided at the zones 202, and the first transmitter modules 106 may also be electrically connected to a power source or battery of the respective movable device.

The control unit 114, the movable devices 108, the motion detectors 102, the receiver modules 104, the first and second transmitter modules 106, 110, the DWS, and the alarm system 116 of the AOI 200 may include a transceiver or a communication module to communicatively connect the control unit 114 to the movable devices 108, the motion detectors 102, the receiver modules 104, the transmitter modules 106, 110, the DWS, and the alarm system 116 of the AOI 200, through a network 118 via wired and/or wireless media. In one or more embodiments, the security system 100 or control unit 114, and mobile devices associated with the registered users 112 or security personnel of the AOI 200 or an admin may be operatively coupled to a website and so be operable from any Internet-enabled user device. The mobile devices may allow the security personnel, the users 112, and the admin to monitor and control the operation of the security system 100. Examples of mobile devices may include but are not limited to, a portable computer, a personal digital assistant, a handheld device, and a workstation.

In one or more embodiments, the network 118 can be a wireless network, a wired network or a combination thereof. Network 118 can be implemented as one of the different types of networks, such as intranet, local area network (LAN), LoRaWAN, wide area network (WAN), the internet, and the like. Further, the network 118 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, network 118 can include a variety of network devices, including transceivers, routers, bridges, servers, computing devices, storage devices, and the like. In another implementation the network 118 can be a cellular network or mobile communication network based on various technologies, including but not limited to, Global System for Mobile (GSM), General Packet Radio Service (GPRS), Code Division Multiple Access (CDMA), Long Term Evolution (LTE), WiMAX, 5G or 6G network protocols, and the like.

Thus, the invention provides a simple, improved, efficient, and cost-effective security system for a multi-zone environment or an area of interest, which may differentiate between the authorized movable devices or authorized users and unauthorized humans or animals, or birds, and further restrict false triggering of the alarm when the authorized movable devices or authorized users are operating within the AOI while keeping the overall security system fully functional.

Figure 4:
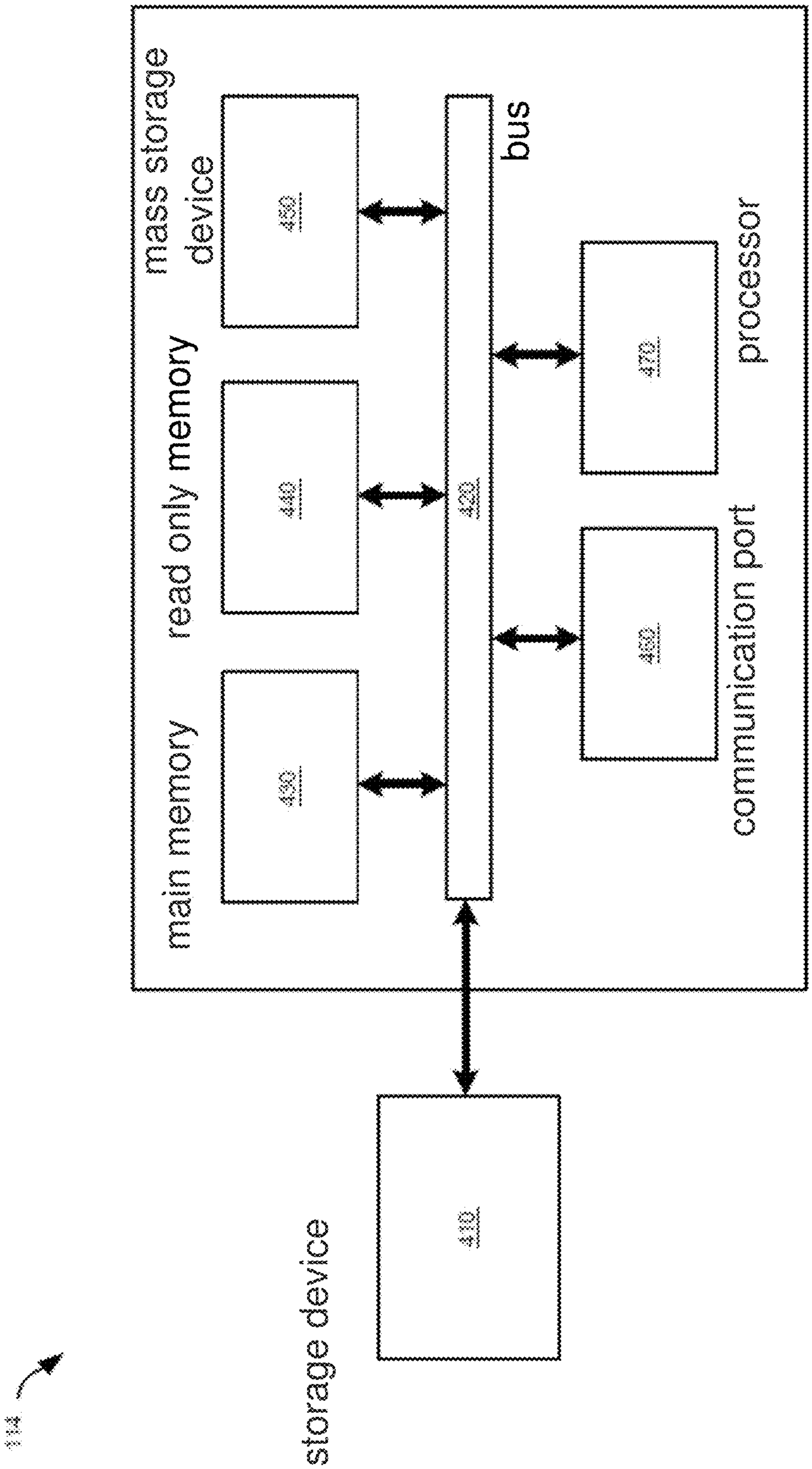
FIG. 4 illustrates an exemplary schematic block diagram of a hardware system used for implementing the control unit of FIG. 1, in accordance with one or more embodiments of the subject disclosure.

FIG. 4 is an exemplary schematic block diagram of a hardware system used for implementing the control unit. As shown in FIG. 4, the control unit can include an external storage device 410, a bus 420, a main memory 430, a read only memory 440, a mass storage device 450, communication port 460, and a processor 470. A person skilled in the art will appreciate that the control unit may include more than one processor and communication ports. Examples of processor 470 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 470 may include various modules. Communication port 460 can be any of an RS-232 port for use with a modem-based dialup connection, a 10/100 Ethernet port, a Gigabit or 10 Gigabit port using copper or fibre, a serial port, a parallel port, or other existing or future ports. Communication port 460 may be chosen depending on a network, such a Local Area Network (LAN), Wide Area Network (WAN), or any network to which control unit connects. Memory 430 can be Random Access Memory (RAM), or any other dynamic storage device commonly known in the art. Read-only memory 440 can be any static storage device(s) e.g., but not limited to, a Programmable Read Only Memory (PROM) chips for storing static information e.g., start-up or BIOS instructions for processor 470. Mass storage 450 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 420 communicatively couples processor(s) 470 with the other memory, storage, and communication blocks. Bus 420 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 470 to software system.

Optionally, operator and administrative interfaces, e.g., a display, keyboard, and a cursor control device, may also be coupled to bus 420 to support direct operator interaction with control unit. Other operator and administrative interfaces can be provided through network connections connected through communication port 460. The external storage device 410 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary control unit limit the scope of the subject disclosure.

While the subject disclosure has been described with reference to exemplary embodiments, it will be understood by those skilled in the art that various changes may be made and equivalents may be substituted for elements thereof without departing from the scope of the subject disclosure as defined by the appended claims. Modifications may be made to adopt a particular situation or material to the teachings of the subject disclosure without departing from the scope thereof. Therefore, it is intended that the subject disclosure not be limited to the particular embodiment disclosed, but that the subject disclosure includes all embodiments falling within the scope of the subject disclosure as defined by the appended claims.

In interpreting the specification, all terms should be interpreted in the broadest possible manner consistent with the context. In particular, the terms “comprises” and “comprising” should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

The invention claimed is:

1. A security system for an area of interest (AOI), the security system comprising:

one or more motion detectors positioned in one or more zones associated with the AOI such that at least one motion detector is positioned in each of the zones;

one or more receiver modules positioned in the one or more zones such that at least one receiver module is positioned in each of the zones;

one or more transmitter modules installed on one or more registered movable devices associated with the AOI, wherein each of the one or more transmitter modules is configured to:

communicate with the one or more receiver modules present in a predefined area around the respective transmitter module; and transmit, to the one or more receiver modules that are in communication with the respective transmitter module, a set of signals comprising details of the movable devices having the respective transmitter module installed thereon; and a control unit in communication with the one or more motion detectors and the one or more receiver modules, wherein in response to the one or more motion detectors associated with any of the one or more zones detecting a movement therein and the one or more receiver modules associated with the respective zone further receiving the set of signals transmitted by the transmitter module associated with the one or more registered movable devices, the control unit is configured to deactivate the one or more motion detectors present in the predefined area around the respective transmitter module and keep other motion detectors activated.

2. The security system of claim 1, wherein when the one or more motion detectors associated with any of the one or more zones detect the movement therein and the one or more receiver modules associated with the respective zone fail to receive the set of signals transmitted by the transmitter module associated with the one or more registered movable devices, the control unit is configured to keep the one or more motion detectors activated and further generate an alarm signal indicative of detection of intrusion or unauthorized movement within the one or more zones.

3. The security system of claim 1, wherein when the one or more motion detectors associated with any of the one or more zones detect the movement therein and the one or more receiver modules associated with the respective zone further receive the set of signals transmitted by the transmitter module associated with the one or more registered movable devices, the control unit is configured to restrict the generation of the alarm signal.

4. The security system of claim 1, wherein when the one or more motion detectors associated with any of the one or more zones fail to detect the movement therein and the one or more receiver modules associated with the respective zone receive the set of signals transmitted by the transmitter module associated with the one or more registered movable devices, the control unit is configured to keep the one or more motion detectors activated and further restrict the generation of the alarm signal.

5. The security system of claim 1, wherein the one or more receiver modules are radio frequency (RF) receivers, and wherein the one or more transmitter modules are radio frequency (RF) transmitters.

6. The security system of claim 1, wherein the control unit is in communication with an alarm system associated with the AOI, wherein the control unit is configured to transmit the generated alarm signal to the alarm system to actuate the alarm system.

7. The security system of claim 1, wherein the control unit is in communication with one or more mobile devices associated with one or more registered security personnel of the AOI, wherein the control unit is configured to transmit the generated alarm signal to the one or more mobile devices.

8. The security system of claim 1, wherein the control unit is in communication with a database, wherein the control unit is configured to:

authenticate and allow registration of the one or more movable devices;

allow one or more registered security personnel to assign the one or more transmitter modules to the one or more registered movable devices; and store, in the database, the details of the one or more registered movable devices and the respective assigned transmitter module being installed thereon.

9. The security system of claim 8, wherein the control unit is configured to:

extract the details of the one or more registered movable devices from the set of signals received by the one or more receiver modules;

track the movement of the one or more registered movable devices in the one or more zones based on the extracted details and the communication between the one or more receiver modules and the one or more transmitter modules; and store the tracked movement in the database.

10. The security system of claim 1, wherein the system comprises one or more door and window sensors installed on doors and windows of the AOI, wherein the control unit is configured to generate the alarm signal upon detection of movement of the doors and/or windows by the one or more door and window sensors.

11. A security system for an area of interest (AOI), the security system comprising:

one or more motion detectors positioned in one or more zones associated with the AOI such that at least one motion detector is positioned in each of the zones;

one or more receiver modules positioned in the one or more zones such that at least one receiver module is positioned in each of the zones;

one or more transmitter modules assigned and provided to one or more registered users associated with the AOI, wherein each of the one or more transmitter modules is configured to:

communicate with the one or more receiver modules present in a predefined area around the respective transmitter module while the one or more registered users are moving in the one or more zones; and transmit, to the one or more receiver modules that are in communication with the respective transmitter module, a set of signals comprising details of the users having the respective transmitter module installed; and a control unit in communication with the one or more motion detectors and the one or more receiver modules, wherein in response to the one or more motion detectors associated with any of the one or more zones detecting a movement therein and the one or more receiver modules associated with the respective zone further receiving the set of signals transmitted by the transmitter module associated with the one or more registered users, the control unit is configured to deactivate the one or more motion detectors present in the predefined area around the respective transmitter module and keep other motion detectors activated.

12. The security system of claim 11, wherein when the one or more motion detectors associated with any of the one or more zones detect the movement therein and the one or more receiver modules associated with the respective zone fail to receive the set of signals transmitted by the transmitter module associated with the one or more registered users, the control unit is configured to keep the one or more motion detectors activated and further generate an alarm signal indicative of detection of intrusion or unauthorized movement within the one or more zones.

13. The security system of claim 11, wherein when the one or more motion detectors associated with any of the one or more zones detect the movement therein and the one or more receiver modules associated with the respective zone further detect the set of signals transmitted by the transmitter module associated with the one or more registered users, the control unit is configured to restrict the generation of the alarm signal.

14. The security system of claim 11, wherein when the one or more motion detectors associated with any of the one or more zones fail to detect the movement therein and the one or more receiver modules associated with the respective zone receive the set of signals transmitted by the transmitter module associated with the one or more registered users, the control unit is configured to keep the one or more motion detectors activated and further restrict the generation of the alarm signal.

15. The security system of claim 11, wherein the one or more receiver modules are radio frequency (RF) receivers, and wherein the one or more transmitter modules are radio frequency (RF) transmitters.

16. The security system of claim 11, wherein the control unit is in communication with an alarm system associated with the AOI, wherein the control unit is configured to transmit the generated alarm signal to the alarm system to actuate the alarm system.

17. The security system of claim 11, wherein the control unit is in communication with one or more mobile devices associated with one or more registered security personnel and the one or more registered users of the AOI, wherein the control unit is configured to transmit the generated alarm signal to the one or more mobile devices.

18. The security system of claim 11, wherein the control unit is in communication with a database, wherein the control unit is configured to:

authenticate and allow registration of the one or more users;

allow one or more registered security personnel to assign the one or more transmitter modules to the one or more registered users; and store, in the database, the details of the one or more registered users and the respective assigned transmitter module.

19. The security system of claim 11, wherein the control unit is configured to:

extract the details of the one or more registered users from the set of signals received by the one or more receiver modules;

track the movement of the one or more registered users in the one or more zones based on the extracted details and the communication between the one or more receiver modules and the one or more transmitter modules; and store the tracked movement in the database.

20. The security system of claim 11, wherein the system comprises one or more door and window sensors installed on doors and windows of the AOI, wherein the control unit is configured to generate the alarm signal upon detection of movement of the doors and/or windows by the one or more door and window sensors.

* * * * *